DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 9

T949,006

OLEFINE POLYMERISATION PROCESS

James Frank Robert Jaggard, Bad Kissengen, Germany, and Ian Gabriel Williams, Letchworth, England, assignors to Imperial Chemical Industries, Limited, London, England

Filed Feb. 13, 1975, Ser. No. 549,750

Claims priority, application Great Britain, Feb. 18, 1974, 7,214/74

Int. Cl.[2] C08F *4/66, 10/06*

U.S. Cl. 260—88.2 R

No Drawing. 79 Pages Specification

An olefine, particularly propylene, is polymerized using a Ziegler catalyst including a transition metal compound which has been contacted with an organo-aluminum compound of the type $R_2AlX$ where X is hydrocarbyl or halogen, a Lewis base and an olefine monomer, the proportions of organo-aluminum compound and Lewis base being in defined ranges and the contacting being effected for a time sufficient to polymerize up to 400 moles of the monomer for each mole of the transition metal compound.

A process is also described for the production of a component of an olefine polymerization catalyst including the steps of mixing together (1) a solid compound of a transition metal of Groups IVA to VIA of the Periodic Table; (2) from 0.05 up to 8 moles, for each mole of the solid compound of the transition metal, at least one compound of the formula: $R_2AlX$ where R is hydrocarbyl and X is hydrocarbyl or halogen, such as diethyl aluminum chloride or aluminum triethyl and (3) from 0.05 up to 4 moles, for each mole of the solid compound of the transition metal, of at least one Lewis base compound, the number of moles of the Lewis base compound being less than the number of moles of the compound $R_2AlX$. Next, the mixture is contacted with at least one linear 1-olefine monomer having from 3 to 8 carbon atoms as set forth above.

The transition metal compound is preferably ball-milled with a Lewis base before being contacted with the organic-aluminum compound, Lewis base and olefine monomer.